United States Patent
Whikehart et al.

(10) Patent No.: US 8,116,713 B2
(45) Date of Patent: Feb. 14, 2012

(54) AUTOMATIC BANDWIDTH CONTROL WITH HIGH-DEVIATION DETECTION

(75) Inventors: J. William Whikehart, Milford, MI (US); Robert Kelly Cadena, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 613 days.

(21) Appl. No.: 12/324,298

(22) Filed: Nov. 26, 2008

(65) Prior Publication Data

US 2010/0130152 A1    May 27, 2010

(51) Int. Cl.
*H04B 1/10* (2006.01)
(52) U.S. Cl. ......... 455/266; 455/296; 455/340; 375/346
(58) Field of Classification Search ............... 455/192.2, 455/266, 296, 307, 339, 340; 375/344, 346
See application file for complete search history.

(56) References Cited

U.S. PATENT DOCUMENTS

| | | | |
|---|---|---|---|
| 6,178,314 B1 * | 1/2001 | Whikehart et al. | ........ 455/188.1 |
| 6,295,324 B1 | 9/2001 | Whikehart | |
| 6,389,273 B1 * | 5/2002 | Brandenburg | ................ 455/296 |
| 6,804,256 B2 | 10/2004 | Chang | |
| 6,917,794 B2 | 7/2005 | Marrah et al. | |
| 6,931,081 B2 | 8/2005 | Meijer et al. | |
| 6,937,871 B2 | 8/2005 | Dick | |
| 8,023,916 B2 * | 9/2011 | Oe | .............................. 455/278.1 |
| 2006/0067710 A1 | 3/2006 | Liu et al. | |
| 2008/0001779 A1 | 1/2008 | Cahill-O'Brien et al. | |
| 2008/0194220 A1 * | 8/2008 | Suzuki | ........................... 455/207 |
| 2009/0061806 A1 * | 3/2009 | Saito et al. | .................... 455/296 |
| 2009/0111410 A1 * | 4/2009 | Kobayashi | .................... 455/214 |
| 2010/0002815 A1 * | 1/2010 | Yan | ............................... 375/350 |

* cited by examiner

*Primary Examiner* — Howard Williams
(74) *Attorney, Agent, or Firm* — Fraser Clemens Martin & Miller LLC; J. Douglas Miller

(57) ABSTRACT

A signal processing system and methods for controlling a bandwidth of the signal processing system are disclosed. One method includes the steps of detecting a presence of an adjacent signal on at one adjacent channel relative to a desired channel, detecting a modulation characteristic of the desired channel, measuring a signal strength on the at least one adjacent channel, measuring a signal strength on the desired channel, and adjusting a bandwidth filter applied to the desired channel in response to the measurements and detection steps.

19 Claims, 3 Drawing Sheets

AUTOMATIC BANDWIDTH CONTROL WITH HIGH-DEVIATION DETECTION

FIELD OF THE INVENTION

The invention relates to signal processing. More particularly, the invention is directed to a signal processing system and method for automatic bandwidth control in the signal processing system.

BACKGROUND OF THE INVENTION

Commercial AM and FM broadcast bands include a plurality of channels. A particular broadcast station is allocated a unique channel to conduct broadcasting within an assigned frequency range.

The FCC allows the modulation of a broadcast in a frequency channel to occupy certain frequency ranges up to certain maximum levels with respect to an unmodulated carrier, specified by a spectral mask. The spectral mask allows for some energy from one channel to appear in adjacent and alternate channels. If the carrier level of an adjacent or alternate channel is significantly higher than the carrier level of the desired channel to which a user is listening, the adjacent or alternate channel may interfere with the desired channel. Assignment of frequency channels to individual transmitters is determined according to geographic location and other factors to minimize interference between transmissions in adjacent channels and alternate channels (an alternate channel is a channel two channels away from the desired channel of interest). Since demand in populous areas is high for the limited number of channels available, adjacent and/or alternate channel interferers are often present. Furthermore, in some cases broadcasts may not adhere to the spectral mask requirements and broadcasts in adjacent and alternate channels produce even higher energy levels in the desired channel.

In FM receivers, it is advantageous to automatically adapt an intermediate frequency (IF) bandwidth based on whether strong adjacent-channel interfering signals are present. When no strong adjacent signals are present, the bandwidth is kept wide for minimum distortion. When adjacent signals are present, the bandwidth is narrowed to reduce interfere cc from the adjacent signals. However, if the desired channel has high modulation (deviation) two problems can occur.

First, the desired modulation content may cause false triggering of adjacent detection, preventing the bandwidth from widening to allow the high-deviation signal to pass. Second, the false adjacent detection may reduce the bandwidth, causing high distortion and an even stronger false detection of adjacent level.

It would be desirable to develop a signal processing system and a method for automatic bandwidth control in the signal processing system, wherein the system and method minimize interference from adjacent signals on adjacent channels, while maximizing bandwidth to limit distortion on a desired channel.

SUMMARY OF THE INVENTION

Concordant and consistent with the present invention, a signal processing system and a method for automatic bandwidth control in the signal processing system, wherein the system and method minimize interference from adjacent signals on adjacent channels, while maximizing bandwidth to limit distortion on a desired channel, has surprisingly been discovered.

In one embodiment, a signal processing system with automatic bandwidth control comprises: an antenna for receiving a plurality of broadcast signals; a tuner circuit for tuning to a pre-determined range of frequencies from a total spectrum of broadcast signals, wherein the tuner circuit tunes the antenna to receive at least one broadcast signal on at least one pre-determined channel; a channel filter in communication with the tuner circuit and adapted to receive the at least one broadcast signal on the at least one channel, wherein the channel filter substantially blocks broadcast signals outside a pre-determined frequency band, while providing transmission of the at least one broadcast signal having a frequency within the pre-determined frequency band; and a processor in communication with the tuner circuit and the channel filter, wherein the processor analyzes the at least one broadcast signal, analyzes content characteristics of the at least one channel, and controls a bandwidth of the channel filter in response to the analysis of the at least one broadcast signal and the analysis of the at least one channel.

The invention also provides methods for controlling a bandwidth of a signal processing system.

One method comprises the steps of: detecting a presence of an adjacent signal on at least one adjacent channel relative to a desired channel, detecting a modulation characteristic of the desired channel measuring a signal strength on the at least one adjacent channel; measuring a signal strength on the desired channel; and adjusting a bandwidth filter applied to the desired channel in response to the measurements and detection steps.

Another method comprises the steps of: tuning to a first adjacent channel having a higher broadcast frequency relative to a desired channel; detecting a presence of an adjacent signal on the first adjacent channel; detecting a modulation characteristic of the desired channel while tuned to the first adjacent channel; measuring a signal strength on the first adjacent channel; tuning to a second adjacent channel having a lower broadcast frequency relative to a desired channel; detecting a presence of an adjacent signal on a second adjacent channel; measuring a signal strength on the second adjacent channel; detecting a modulation characteristic of the desired channel while tuned to the second adjacent channel; tuning to the desired channel; measuring a signal strength on the desired channel; and adjusting a bandwidth filter applied to the desired channel in response to the measurements and detection steps.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention.

The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
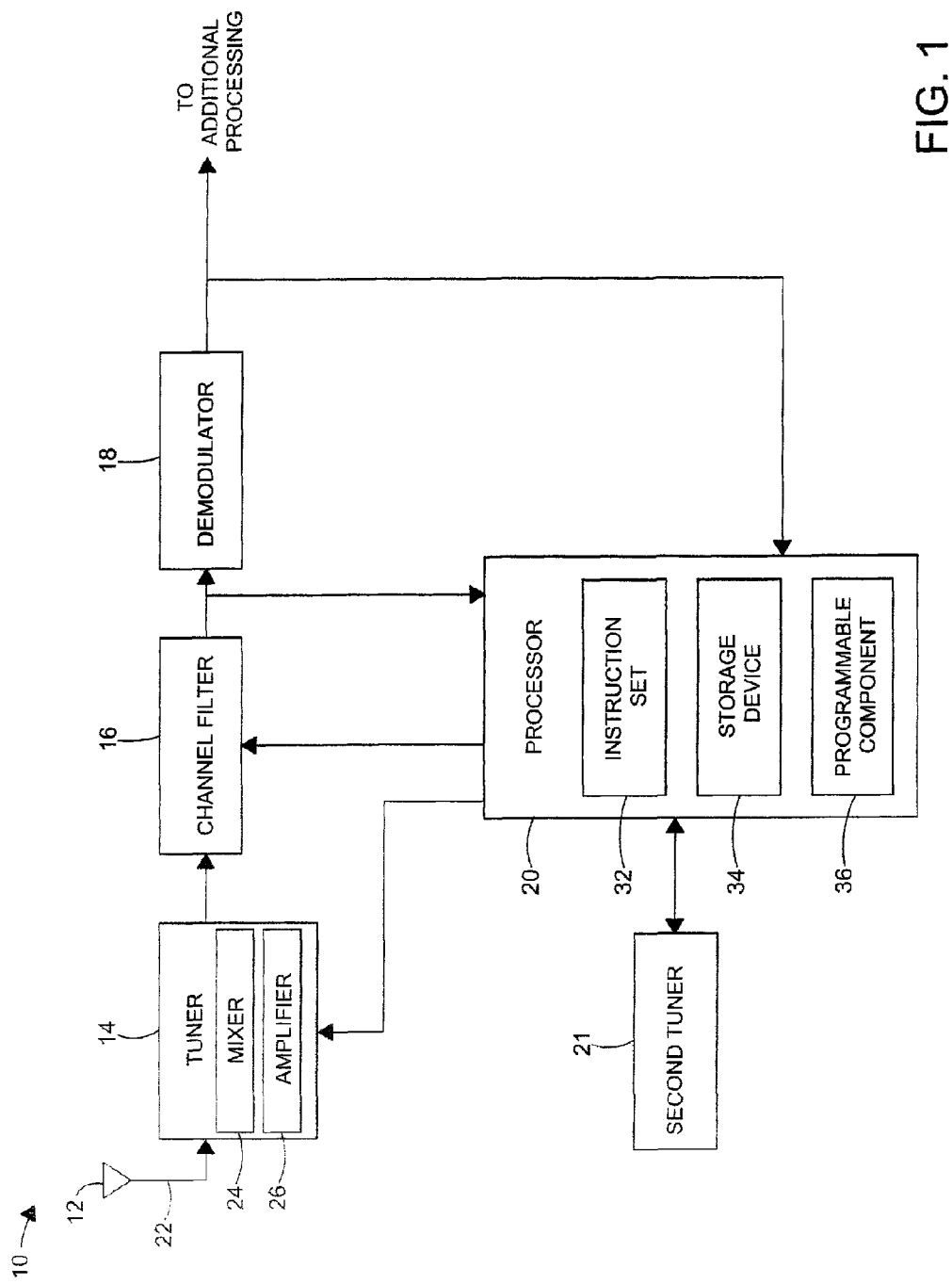
FIG. 1 is a schematic block diagram of a signal processing system according to an embodiment of the present invention.

FIG. 1 illustrates a signal processing system 10 according to an embodiment of the present invention. As shown, the signal processing system 10 includes an antenna 12, a tuner circuit 14, a channel filter 16, a demodulator 18, and a processor 20. It is understood that the signal processing system 10 may include additional components such as a second tuner 21, for example. As a non-limiting example, the second tuner 21 may be used to monitor various characteristics of multiple signal channels.

The antenna 12 is adapted to receive a broadcast radio frequency (RF) signal 22 and transmit the RF signal 22 to the tuner circuit 14. The antenna 12 may be any device for receiving broadcast signals having a pre-determined range of frequencies.

The tuner circuit 14 is adapted to "tune" to a pre-determined narrow range of frequencies from the total spectrum of broadcast signals and ambient radio waves. As shown, the tuner circuit 14 includes a mixer 24 and an RF amplifier 26 which cooperate to generate a carrier-based signal in the form of an intermediate frequency (IF) signal having a lower frequency than the original broadcast frequency. It is understood that the tuner circuit 14 may include additional components and features such as automatic gain control, for example. It is further understood that the tuner circuit 14 may be controlled or modified to tune to any signal channel or frequency range, as desired. As such, the tuner circuit 14 transmits the IF signal to the channel filter 16.

The channel filter 16 is adapted to block signals outside a pre-determined frequency band, while providing transmission of a desirable range of frequencies. The channel filter 16 may be any filter circuit for controlling the transmission of signals based upon frequency, now known or later developed. It is understood that the channel filter 16 may be controlled or modified to adjust the frequency band (i.e. bandwidth), as desired.

The demodulator 18 is adapted to receive the IF signal, process the IF signal, and extract an information content from a modulated carrier wave of the IF signal. As such, the demodulator 18 transmits an audio signal representing a demodulated form of the IF signal. In certain embodiments, the demodulator 18 is a quadrature demodulator or detector as is known in the art. However, other devices, systems, and methods of demodulation may be used such as a phase-locked loop circuit, a Foster-Seeley discriminator, and other electronic filters and detectors, for example. It is understood that the audio signal may be transmitted to further processing components such as a stereo decoding circuit (not shown), for example.

The processor 20 illustrated is in communication with the tuner circuit 14 and the channel filter 16. As such, the processor 20 adjusts the tuner circuit 14 to "tune" to a pre-determined narrow range of frequencies or pre-determined signal channels. The processor 20 also controls the settings and functions of the channel filter 16 to modify a bandwidth of transmitted signals. It is understood that the processor 20 may intercommunicate with additional device and components of the signal processing system 10 such as the demodulator 18 and the second tuner 21. Additionally, the processor 20 is adapted to receive samples of the IF signal and the audio signal for detecting signal levels and processing the received signals for measurement and signal analysis. The processor 20 may be any device or system adapted to receive a sample of the transmitted signals, analyze and evaluate the signals, and control the tuner circuit 14 and channel filter 16 in response to the analysis and evaluation of the sampled signals.

As shown, the processor 20 analyzes and evaluates the sampled signals based upon an instruction set 32. The instruction set 32, which may be embodied within any computer readable medium, includes algorithms and processor executable instructions for configuring the processor 20 to perform a variety of tasks. It is understood that the processor 20 may execute a variety functions such as controlling the functions of the tuner circuit 14 and channel filter 16, for example.

In certain embodiments, the processor 20 may include a storage device 34. The storage device 34 may be a single storage device or may be multiple storage devices. Furthermore, the storage device 34 may be a solid state storage system, a magnetic storage system, an optical storage system or any other suitable storage system or device. It is understood that the storage device 34 is adapted to store the instruction set 32. Other data and information may be stored in the storage device 34, as desired.

The processor 20 may further include a programmable component 36. It is understood that the programmable component 36 may be in communication with any other component of the signal processing system 10 such as the tuner circuit 14 and the channel filter 16, for example. In certain embodiments, the programmable component 36 is adapted to manage and control processing functions of the processor 20. Specifically, the programmable component 36 is adapted to control the analysis of the sampled signals. It is understood that the programmable component 36 may be adapted to store data and information on the storage device 34, and retrieve data and information from the storage device 34.

Figure 2:
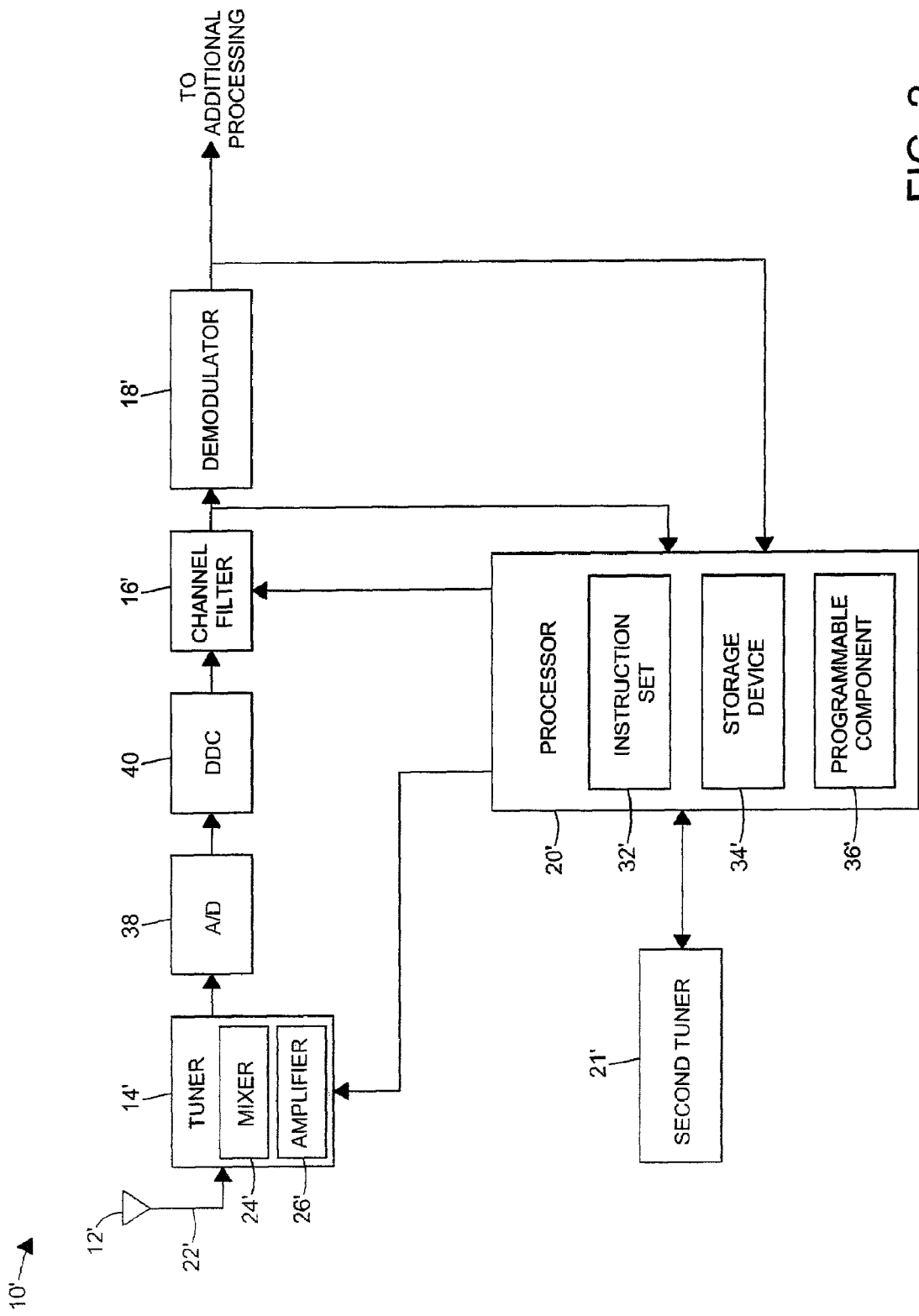
FIG. 2 is a schematic block diagram of a signal processing system according to another embodiment of the present invention.

FIG. 2 illustrates a signal processing system 10' according to another embodiment of the present invention similar to the signal processing system 10 of FIG. 1, except as described below. Structure repeated from the description of FIG. 1 includes the same reference numeral and a prime (') symbol. As shown, the signal processing system 10' includes an analog-to-digital converter (A/D converter) 38 and a digital down converter (DDC) 40.

The A/D converter 38 is adapted to receive a continuous signal and convert the signal into a discrete digital representation, as can be appreciated by someone skilled in the art of digital signal processing. Specifically, the A/D converter 38 is adapted to receive the IF signal from the tuner circuit 14', convert the IF signal, and transmit a digital representation of the IF signal to the DDC 40. It is understood that the A/D converter 38 may be any analog-to-digital conversion devices or system now known or later developed.

The DDC 40 converts the digitized IF signal to a baseband signal centered at zero frequency. In addition to down conversion, the DDC 40 may decimate the IF signal to a lower sampling rate.

In operation, the signal processing system 10, 10' is tuned to an adjacent signal channel having a pre-determined frequency range. Characteristics of the signal content of the adjacent channel are measured to determine a presence of an actual broadcast signal at the adjacent channel and modulation characteristics of a signal at the desired channel. In addition, level measurements or "signal strength" measurements on the desired channel and the adjacent channels are performed to determine the respective signal strengths. The results from all of the measurements are automatically analyzed using a structure of thresholds and logical decisions to determine whether an actual signal is present on an adjacent channel and whether the signal at the desired channel has high-modulation. The bandwidth or range of bandwidths is adjusted in response to the analysis of the measurements. It is understood that both binary measurements and signal data in a digital processing system and continuous measurements and signal data in an analog processing system may be analyzed.

Figure 3:
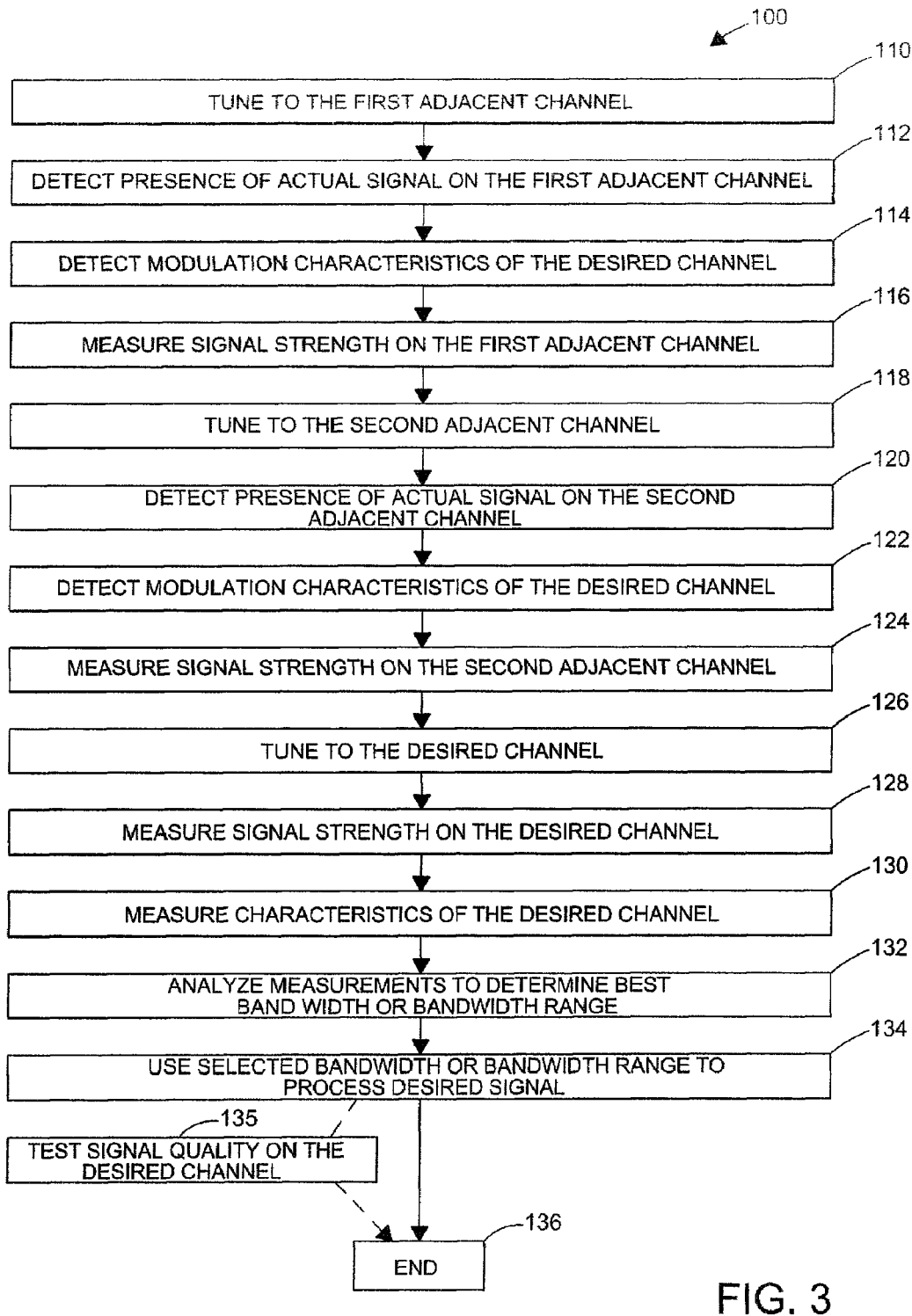
FIG. 3 is a flow chart of a method for controlling a bandwidth of a signal processing system, according to an embodiment of the present invention.

Specifically, FIG. 3 illustrates a method 100 for controlling a filter bandwidth for the signal processing system 10, 10' according to the present invention. It is understood that the desired channel may be any dedicated channel for conducting broadcasting within a pre-determined frequency range.

In step 110, the tuner circuit 14, 14' is tuned to a first adjacent channel, wherein the first adjacent channel is a signal channel having a frequency that is higher than the desired channel. It is understood that the first adjacent channel may be a signal channel having a frequency that is lower than the desired channel.

In step 112, the processor 20, 20' detects whether an actual signal is being broadcast on the first adjacent channel. As a non-limiting example, the detection of an actual signal on the first adjacent channel is based on the detection of a pilot waveform, wherein the detection of a pilot waveform indicates the presence of an actual signal. As another example, the detection of an actual signal on the first adjacent channel is based on a signal quality at the first adjacent channel. In certain embodiments, the signal quality is measured by performing demodulation and measuring ultra-sonic noise. In other embodiments, the signal quality is measured using intermediate frequency measurement methods similar to the methods disclosed in applicant's commonly owned U.S. Pat. No. 6,295,324, hereby incorporated herein by reference in its entirety.

In step 114, the processor 20, 20' detects modulation characteristics of a signal broadcast on the desired channel to determine whether the signal has a high-modulation or high-deviation. It is understood that the modulation characteristics may be detected by at least one of: measuring a level of ultrasonic noise; measuring a modulation level; measuring an audio level; and measuring a frequency content. It is further understood that certain modulation characteristics are detected while tuned to at least one adjacent channel, while other modulation characteristics are detected while tuned to the desired channel. As a non-limiting example, the modulation characteristics include at least one of a modulation level, a level of frequency deviation of the carrier signal, and bandwidth on the frequency content of a modulating signal.

In certain embodiments, the modulation characteristics are detected while the signal processing system 10, 10' is tuned to an adjacent channel. As a non-limiting example, the signal processing system 10, 10' is tuned to an adjacent channel for detection of fast noise disturbances due to breakthroughs of the desired on high-deviation peaks. It is understood that the presence of noise disturbances may be detected by monitoring the intermediate frequency signal level for peak detection. It is further understood that disturbance noise may be detected using intermediate frequency measurement methods similar to the methods disclosed in applicant's commonly owned U.S. Pat. No. 6,295,324.

As a further example, the signal processing system 10, 10' may be tuned to the desired channel, wherein the bandwidth is adjusted to a range that will pass signals with a pre-determined deviation. As such, a signal quality through the desired channel is measured by performing demodulation and ultrasonic noise measurement while the signal processing system 10, 10' is tuned to an adjacent channel. It is understood that the signal quality may be measured using intermediate frequency measurement methods similar to the methods disclosed in applicant's commonly owned U.S. Pat. No. 6,295,324.

As a further example, the signal processing system 10, 10' measures signal content levels in the desired channel, the first adjacent channel, and the second adjacent channel. As such, the content level of each of the channels is analyzed and compared. It is understood that where high-deviation is present on the desired channel, the content of each of the first adjacent channel and the second adjacent channel is substantially the same due to the symmetric nature of modulation signals. It is further understood that combinations of specific detection methods may be used to add further robustness to the high-deviation detection.

In step 116, the processor 20, 20' measures an IF level or signal strength of the while the tuner circuit 14, 14' is tuned to the first adjacent channel.

In step 118, the tuner circuit 14, 14' is tuned to a second adjacent channel, wherein the second adjacent channel is a signal channel having a frequency that is lower than the desired channel. It is understood that the second adjacent channel may be a signal channel having a frequency that is higher than the desired channel.

In step 120, the processor 20, 20' detects whether an actual signal is being broadcast on the second adjacent channel. As a non-limiting example, the detection of an actual signal on the second adjacent channel is based on the detection of a pilot waveform, wherein the detection of a pilot waveform indicates the presence of an actual signal. As another example, the detection of an actual signal on the second adjacent channel is based on a signal quality on the second adjacent channel. In certain embodiments, the signal quality is measured by performing demodulation and measuring ultra-sonic noise, in other embodiments, the signal quality is measured using intermediate frequency measurement methods similar to the methods disclosed in applicant's commonly owned U.S. Pat. No. 6,295,324 hereby incorporated herein by reference in its entirety.

In step 122, the processor 20, 20' detects modulation characteristics of a signal broadcast on the desired channel to determine whether the signal has a high-modulation or high-deviation. It is understood that the modulation characteristics may be detected by at least one of measuring a level of ultrasonic noise; measuring a modulation level; measuring an audio level; and measuring a frequency content. It is further understood that certain modulation characteristics are detected while tuned at least one adjacent channel, while other modulation characteristics are detected while tuned to the desired channel. As a non-limiting example, the modulation characteristics include at least one of a modulation level, a level of frequency deviation of the carrier signal, and bandwidth on the frequency content of a modulating signal. Similar to step 114, a determination of a high-deviation content may be measured by at least one of the high-deviation detection methods, described above. It is understood that combinations of the specific detection methods may be used to add further robustness to the high-deviation detection.

In step 124, the processor 20, 20' measures an IF level or signal strength of the while the tuner circuit 14, 14' is tuned to the second adjacent channel.

In step 126, the tuner circuit 14, 14' is tuned to the desired channel. Once tuned, the processor 20, 20', measures an intermediate frequency signal level or signal strength at the desired channel, shown in step 128.

In step 130, the processor 20, 20' measures additional characteristics of the desired channel and the signal broadcast at the desired channel such as level characteristics and channel content, for example.

In step 132, the processor 20, 20' analyzes the measurements received from steps 110 through 130 to determine a preferred or "best" bandwidth setting for the desired channel. Specifically, the results from all of the measurements are automatically analyzed using a structure of thresholds and logical decisions to determine whether either an adjacent signal is truly present or that the desired channel has high-deviation.

in step 134, the processor 20, 20' adjusts the channel filter 16, 16' in response to the analysis of the measurements in step 132. As a non-limiting example, the bandwidth at the desired channel is adjusted to minimize interference from adjacent signals on adjacent channels, while maximizing bandwidth to limit distortion on the desired channel.

in step 136, the method 100 is finalized. However, the method 100 may include a quality test step, shown in step 135. For example, where the desired channel has been determined to have high-deviation, the bandwidth is widened and a secondary signal quality measurement is made. If signal quality is determined to be satisfactory, the bandwidth decision is confirmed and the method 100 is directed to step 136 and finalized. Otherwise, the method 100 is routed to step 110.

In certain embodiments, where a signal strength of an actual signal detected on the first adjacent channel exceeds a pre-determined threshold, the bandwidth will be narrowed and no measurements on the other adjacent channels are required. Additionally, a "pre-measurement" of the signal levels of the desired channel and at least one of the adjacent channels may be used to determine the "strongest" signal on the at least one of the adjacent channels. Accordingly, the bandwidth may be modified in response to the strongest adjacent signal.

The signal processing system 10, 10' and methods according to the present invention provide automatic bandwidth control including a detection of a high-deviation signal at the desired channel. As such, the bandwidth at the desired channel is adjusted to minimize interference from adjacent signals on adjacent channels, while maximizing bandwidth to limit distortion on the desired channel.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for controlling a bandwidth of a signal processing system, the method comprising the steps of:
    tuning the signal processing system to at least one adjacent channel relative to a desired channel;
    detecting a presence of an adjacent signal on the at least one adjacent channel relative to the desired channel;
    detecting a modulation characteristic of the desired channel while tuned to the at least one adjacent channel;
    measuring a signal strength on the at least one adjacent channel;
    measuring a signal strength on the desired channel; and
    adjusting a bandwidth filter applied to the desired channel in response to the measurements and detection steps.

2. The method according to claim 1, wherein the steps of the method are performed by the signal processing system including a processor and at least one tuner circuit.

3. The method according to claim 1, wherein the presence of an adjacent signal is detected based on at least one of detecting a pilot waveform, measuring intermediate frequency quality, comparing sideband symmetry, and performing demodulation and measuring ultra-sonic noise.

4. The method according to claim 1, wherein the modulation characteristics include at least one of a modulation level, a level of frequency deviation of the carrier signal, and bandwidth on the frequency content of a modulating signal.

5. The method according to claim 1, wherein the modulation characteristics of the desired channel are detected based on at least one of a level of ultrasonic noise, a modulation level, an audio level, an intermediate frequency measurement, and a frequency content.

6. The method according to claim 1, wherein the bandwidth filter is adjusted in response to characteristics of the adjacent signal on the at least one adjacent channel and the modulation characteristic of the desired channel.

7. The method according to claim 1, wherein the bandwidth filter is adjusted to minimize distortion from adjacent interference, while maximizing bandwidth to limit distortion on the desired channel.

8. A method for controlling a filter bandwidth of a signal processing system, the method comprising the steps of:
    tuning to a first adjacent channel having a higher broadcast frequency relative to a desired channel;
    detecting a presence of an adjacent signal on the first adjacent channel;
    detecting a modulation characteristic of the desired channel while tuned to the first adjacent channel;
    measuring a signal strength on the first adjacent channel;
    tuning to a second adjacent channel having a lower broadcast frequency relative to a desired channel;
    detecting a presence of an adjacent signal on a second adjacent channel;
    measuring a signal strength on the second adjacent channel;
    detecting a modulation characteristic of the desired channel while tuned to the second adjacent channel;
    tuning to the desired channel;
    measuring a signal strength on the desired channel; and
    adjusting a bandwidth filter applied to the desired channel in response to the measurements and detection steps.

9. The method according to claim 8, wherein the steps of the method are performed by the signal processing system including a processor and at least one tuner circuit.

10. The method according to claim 8, wherein the presence of an adjacent signal is detected based on at least one of detecting a pilot waveform, measuring intermediate frequency quality, comparing sideband symmetry, and performing demodulation and measuring high-frequency noise.

11. The method according to claim 8, wherein the modulation characteristics include at least one of modulation level, a level of frequency deviation of the carrier signal, and bandwidth on the frequency content of a modulating signal.

12. The method according to claim 8, wherein the modulation characteristics of the desired channel are detected based on at least one of a level of ultrasonic noise, a modulation level, an audio level, an intermediate frequency measurement, and a frequency content.

13. The method according to claim 8, wherein the bandwidth filter is adjusted in response to characteristics of the adjacent signal on the at least one adjacent channel and the modulation characteristic of the desired channel.

14. The method according to claim 8, wherein the bandwidth filter is adjusted to minimize distortion from adjacent interference, while maximizing bandwidth to limit distortion on the desired channel.

15. A signal processing system with automatic bandwidth control comprising:
    an antenna for receiving a plurality of broadcast signals;

a tuner circuit for tuning to a pre-determined range of frequencies from a total spectrum of broadcast signals, wherein the tuner circuit tunes to receive at least one broadcast signal on at least one desired channel and tunes to receive at least one adjacent channel relative to the at least one desired channel;

a channel filter in communication with the tuner circuit and adapted to receive the at least one broadcast signal on the at least one desired channel, wherein the channel filter substantially blocks broadcast signals outside a pre-determined frequency band, while providing transmission of the at least one broadcast signal having a frequency within the pre-determined frequency band; and a processor in communication with the tuner circuit and the channel filter, wherein the processor analyzes the at least one broadcast signal, analyzes at least one content characteristic of the at least one desired channel while tuned to the at least one desired channel and the at least one adjacent channel, analyzes at least one content characteristic of the at least one adjacent channel, and controls a bandwidth of the channel filter in response to the analysis of the at least one broadcast signal, the analysis of the at least one desired channel, and the analysis of the at least one adjacent channel.

16. The signal processing system according to claim 15, further comprising:

an analog-to-digital converter in communication with the tuner circuit, the analog-to-digital converter adapted to receive the at least one broadcast signal and convert the at least one broadcast signal into a discrete digital representation;

a digital down converter in communication with the analog-to-digital converter, the digital down converter adapted to receive the discrete digital representation and center the discrete digital representation at a substantially zero frequency.

17. The signal processing system according to claim 15, wherein the analysis of the at least one broadcast signal includes measuring at least one of: a modulation level; an audio level; an intermediate frequency level; a level of frequency deviation of a carrier signal; and a bandwidth on the frequency content of a modulating signal.

18. The signal processing system according to claim 15, wherein the analysis of the at least one desired channel includes at least one of: detecting a presence of an actual signal; detecting modulation characteristics; detecting a pilot waveform, measuring intermediate frequency quality, comparing sideband symmetry, and performing demodulation and measuring ultra-sonic noise.

19. The signal processing system according to claim 15, the channel filter is adjusted to minimize distortion from adjacent interference, while maximizing bandwidth to limit distortion on the desired channel.

* * * * *